(12) United States Patent
Drebes et al.

(10) Patent No.: US 8,556,110 B2
(45) Date of Patent: Oct. 15, 2013

(54) FUEL TANK HAVING INSTALLATIONS AND METHOD FOR THE PRODUCTION THEREOF

(75) Inventors: Mario Drebes, Berlin (DE); Mark Polifke, Frechen (DE)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 18 days.

(21) Appl. No.: 13/145,329

(22) PCT Filed: Jan. 22, 2010

(86) PCT No.: PCT/EP2010/050741
§ 371 (c)(1),
(2), (4) Date: Jul. 19, 2011

(87) PCT Pub. No.: WO2010/084179
PCT Pub. Date: Jul. 29, 2010

(65) Prior Publication Data
US 2011/0278286 A1    Nov. 17, 2011

(30) Foreign Application Priority Data
Jan. 22, 2009   (DE) .......................... 10 2009 005 827

(51) Int. Cl.
*B65D 88/12* (2006.01)
*B65D 90/36* (2006.01)

(52) U.S. Cl.
USPC .......................... 220/563; 220/89.4

(58) Field of Classification Search
USPC ............. 220/563, 562, 564, 4.14, 4.13, 4.12, 220/613, 612, 678, 677, 373, 372, 371, 220/367.1, 254.1, 746, 745, 89.4, 89.1

IPC ............................................. B65D 88/12,90/36
See application file for complete search history.

(56) References Cited

U.S. PATENT DOCUMENTS

| | | | | |
|---|---|---|---|---|
| 1,352,022 A | * | 9/1920 | Pajalic | 220/372 |
| 2,733,775 A | * | 2/1956 | Depure | 210/348 |
| 3,583,593 A | * | 6/1971 | Merritt | 220/560.02 |
| 4,531,653 A | | 7/1985 | Sakata | |
| 5,398,839 A | * | 3/1995 | Kleyn | 220/560.03 |
| 6,338,420 B1 | * | 1/2002 | Pachciarz et al. | 220/562 |
| 6,367,503 B1 | | 4/2002 | Keller et al. | |
| 6,591,866 B2 | | 7/2003 | Distelhoff et al. | |

(Continued)

FOREIGN PATENT DOCUMENTS

| | | |
|---|---|---|
| CA | 2318653 A1 | 3/2001 |
| DE | 3224338 A1 | 3/1983 |
| DE | 19825104 A1 | 1/1999 |
| DE | 19932713 A1 | 1/2001 |
| DE | 60205386 T2 | 5/2006 |

(Continued)

*Primary Examiner* — Robert J Hicks
(74) *Attorney, Agent, or Firm* — Bachman & LaPointe, P.C.

(57) ABSTRACT

A fuel tank that is composed of plastic and that has installations. In order to functionally improve the fuel tank and to simplify the manufacturing, a shaped piece (15) is attached to the inside of the wall (1) of the fuel tank and connected to the fuel tank in a bonded manner. The shaped piece (15) is a flat component that has an open three-dimensional shape and forms at least one channel (17) and/or tank together with the plastic shell (1). The shaped piece (15) is welded all around to the plastic shell (1), wherein a welding flange (20) forming a closed curve follows the contour of the channel (17). The shaped piece (15) has at least one mouth part (16) that is open toward the tank interior and is integral with the shaped piece.

9 Claims, 5 Drawing Sheets

(56) References Cited

U.S. PATENT DOCUMENTS

| | | |
|---|---|---|
| 6,834,771 B2 | 12/2004 | Suzuki et al. |
| 2002/0020705 A1* | 2/2002 | Vorenkamp et al. ......... 220/4.14 |
| 2002/0053566 A1* | 5/2002 | Balzer et al. ................. 220/4.13 |
| 2008/0224363 A1* | 9/2008 | Criel et al. .................... 264/526 |

FOREIGN PATENT DOCUMENTS

| | | |
|---|---|---|
| DE | 102006059799 A1 | 6/2008 |
| EP | 1084889 A1 | 3/2001 |
| EP | 1310715 A1 | 5/2003 |
| GB | 2105666 A | 3/1983 |

* cited by examiner

FUEL TANK HAVING INSTALLATIONS AND METHOD FOR THE PRODUCTION THEREOF

BACKGROUND OF THE INVENTION

The invention relates to a fuel tank made of plastic for motor vehicles, wherein installations are located in the interior of the fuel tank. The wall of the fuel tank may consist of a single blow-molded piece having a sufficiently large opening or of two pressed or deep-drawn plastic shells which are subsequently joined together. The mentioned forming processes use a mold, wherein the plastic is molded at a warm state. The walls may also be multilayered in order to minimize permeation of fuel vapors. The installations may be of different kinds; usually they are parts of a venting system, such as valves, separators, debubbling tanks and/or float chambers and pipes or tubes connecting these.

In the case of conventional fuel tanks made of plastic, the parts of the venting system are individually mounted at the inside of the upper shell either by welding (see, for example, EP 1 310 715 A1) or by attaching them to weld crowns secured in through-holes of the shell (see, for example, EP 1 084 889 A1). In any case, however, the individual parts are interconnected or connected to the atmosphere through pipes. The parts or weld crowns all have small surfaces.

Mounting and connecting the individual parts of the venting system and of the connection pipes thereof to the inside of the plastic shell are labor-intensive—and therefore expensive—manufacturing processes. This is true especially in cases where the fuel tank is indented for reasons of space economy in a passenger car and where the walls or the plastic parts of the walls have a large spatial depth. In these cases the pipes or tubes are freely suspended in the interior of the fuel tank and may vibrate, which renders them susceptible to failure and may generate rattling noises. Attaching them to the walls further increases the amount of labor required during manufacturing. Moreover, the cross section of the pipes or tubes and their radius of curvature are limited. The former impairs functionability, the latter restricts design flexibility.

DE 10 2006 059 799 A1 discloses a fuel tank made of plastic, wherein a surge container is attached at the bottom of the fuel tank and profiled sections are attached at the top wall of the fuel tank in such a manner that they have flanges with welding projections, which are pressed into the inner wall of the tank part while it is warm and lying in the mold and are integrally bonded thereto in this way. The surge container and the profiled sections are not associated in any way. There is no connection with any functional parts.

The object of the invention to form the installations of a fuel tank made of plastic such that requirements are fulfilled, while expenditure for labor, tools and logistics are kept to a minimum, and that their functionality is improved, while great economy of space and design flexibility are achieved. The installations are also to be suitable for fuel tanks of complex shapes (especially for fuel tanks having a deeply profiled top wall) and should not make a rattling noise.

SUMMARY OF THE INVENTION

The object is achieved by providing a plastic fuel tank having a channel shaped formed piece welded thereto. Due to the fact that all of the installations are combined in one formed piece, they can be simply and fast mounted by integral bonding to the wall.

The formed piece is a flat component forming an open space; thus it can be injection-molded in a simple mold or pressed from a planar panel. The formed piece forms at least one channel together with the wall of the fuel tank. The corresponding part of the formed piece is virtually a "half pipe". The channel formed in this way takes the place of the previously used common pipe. Due to the fact that the channel is formed, on the one hand, by the formed piece and, on the other hand, by the wall, it has a closed cross section without there being any vibrating or rattling connection pipes. Furthermore, due to this fact, the cross section of the channel can be freely chosen, which allows better economy of space and at the same time larger flow cross-sections. Moreover, the channel can extend in a curvature with a very narrow radius (which in the case of a pipe or a tube would lead to kinking), and the channel itself can be provided with installations and, if necessary, with local reinforcements.

For the purpose of compensating tolerances and rendering the formed piece suitable for being installed in a plastic shell having a complex shape, it is essential that the welding flange of the formed piece does not only follow the spatial shape of the wall of the plastic tank, but also the contour of the channel. Due to this fact the formed piece is a component which does not have any large surfaces and which is rigid due to its spatial shape. The part of the formed piece forming a channel is hardly any wider than the channel itself. Therefore it is bendable enough to compensate for small dimensional deviations. The formed piece is welded all around to the wall plastic tank, wherein the weld seam forms a closed curve. The curve can be interrupted at a place where a connection is to be provided to the interior of the fuel tank.

For a connection to the interior of the fuel tank, the formed piece has at least one mouth piece which is open to the interior of the tank and integral therewith. The mouth piece can be embodied corresponding to its respective function or to the component to be installed.

Beyond the advantages mentioned, the invention decreases expenditure for quality control and, due to the one piece form, also for logistics and stock-keeping.

In general, the formed piece embodied according to the invention provides large design flexibility. No further expenditure in manufacturing is required in cases where the formed piece is to form several channels and where one or more of the channels are to be enlarged to a space forming a tank. These channels or the tank can contain installations which are integral therewith, such as reinforcements, diaphragms or baffle plates, which, where appropriate, are also connected to the wall of the fuel container.

A channel which has been enlarged to a tank can be formed without connection to the interior of the fuel tank, so to say, as a container in a container, and can be connected to components arranged outside the fuel tank. The same applies to channels which have not been enlarged. Holes can be cut out of the wall of the fuel tank at certain locations in order to provide connection to the outside. The formed piece overlaps the at least one opening in the wall, which provides connection to the atmosphere or to an external component (for example, to an activated carbon filter).

According to a further development of the invention, the mouth piece is a flange formed for receiving, for example, a valve, preferably with latches or elastic parts for snap-fitting the valve. Nevertheless, conventional valves or installation components can also be welded to the formed piece in a conventional manner. Further, the mouth piece or another mouth piece can be formed at one end of the channel as a drop separator. In a particularly simple and efficient embodiment, such a drop separator can be embodied such that the mouth piece of the formed piece has a small hole to which a cylindrical guide wall is connected towards the inside, followed by a baffle wall. In this way, the separated liquid can immediately flow back into the fuel tank through the hole.

In order to obtain a sealed and durable welded joint, the welding flange of the formed piece has at least one root having a wedge-shaped cross section, wherein the root substantially perpendicularly penetrates the plastic shell. The root extending towards a sharp edge—or, in other words, the welding flange—easily penetrates the warm plastic shell, heats up to its temperature within a particularly short time and in this way forms a tight connection therewith. Therefore the formed piece does not need to be heated, which simplifies its installation.

The large design flexibility can also be used such that a portion of the formed piece forming a channel has at least one reinforcing rib extending transversely to its longitudinal direction, or even several reinforcing ribs, like the bellows of an accordion. The former provides reinforcement in the transverse direction while maintaining bendability in the longitudinal direction; the latter increases bendability in the longitudinal direction for compensating tolerances.

DETAILED DESCRIPTION

Figure 1:
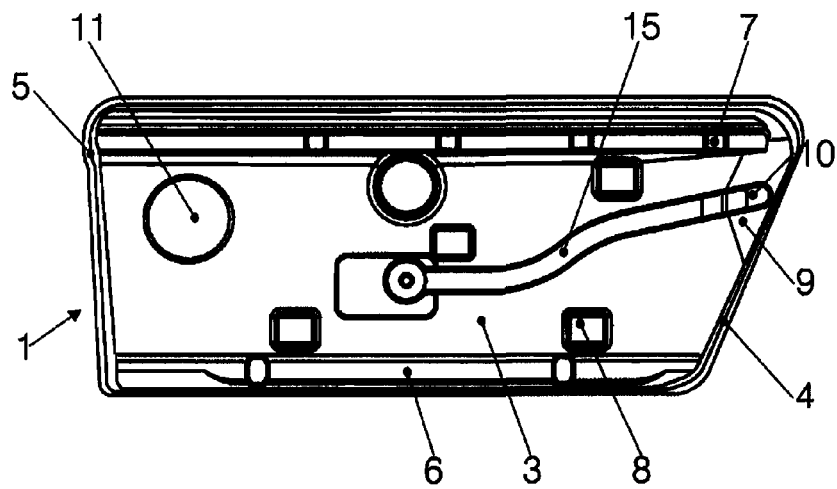
FIG. 1: bottom view of the top shell of a fuel tank according to the invention.
Figure 2:
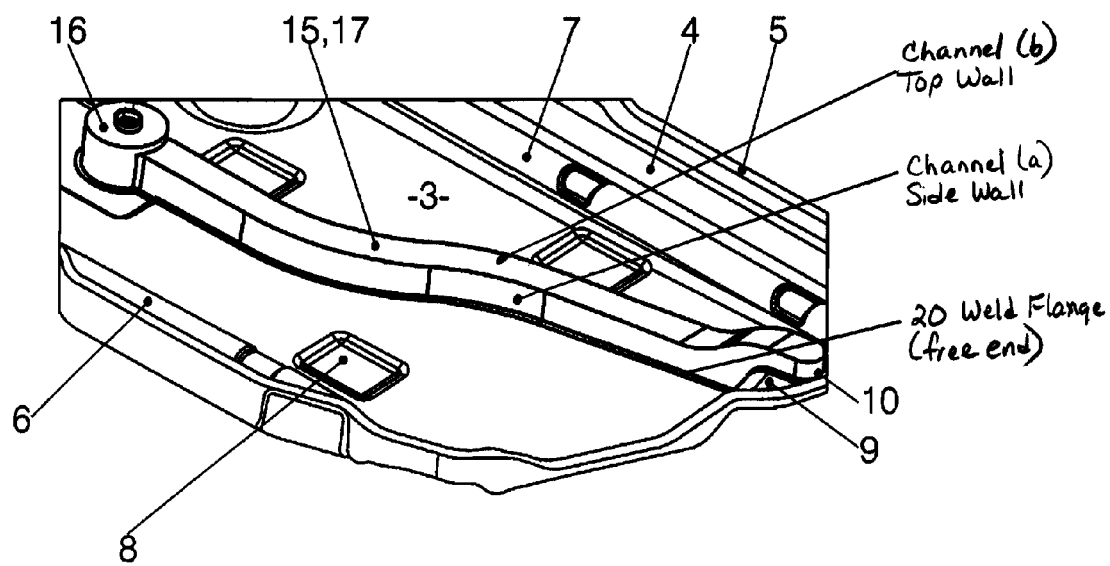
FIG. 2: axonometric view of the top shell, somewhat enlarged.
Figure 7:
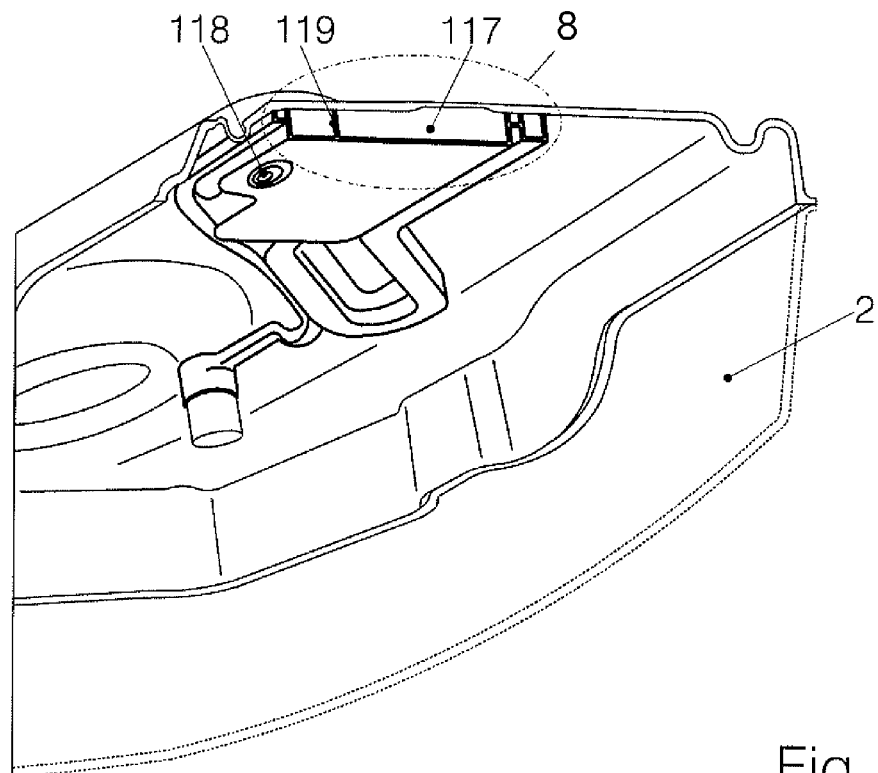
FIG. 7 section 7-7 of FIG. 6.

In FIGS. 1 and 2 the first—upper—plastic shell of a fuel tank composed of two parts is in summary designated by 1, the second—lower—plastic shell 2 is indicated by a dashed line in FIG. 7. The upper wall, in this case the first plastic shell 1, consist of a large-surface top wall 3, which may be non-planar, a side wall 4 extending all around and a welding flange 5 flanged outwardly from the side wall 4. For stiffening purposes, the plastic shell 1 has elongate reinforcing beads 6, 7 and rectangular reinforcing dents 8. A portion of the plastic shell 1 is shaped to form a step 9 having a first hole 10, through which connection is made to the atmosphere or to another component, such as an activated carbon filter. This hole 10 is cut out, as the case may be, only after the installations have been attached. A second larger hole 11 is intended for installing a pumping unit or the like (not shown) and could be used in the case of a one-piece blow-molded plastic tank also for inserting further installations.

Further installations, in particular venting installations, are combined to form a formed piece 15 according to the invention. In FIG. 1, the formed piece 15 is shown in its most simple embodiment, in which it consists only of a "half pipe" 17 and a mouth piece 16. In this case, the channel formed by the formed piece 15 together with the wall of the fuel tank, the first plastic shell 1, has a closed rectangular cross section.

Figure 3:
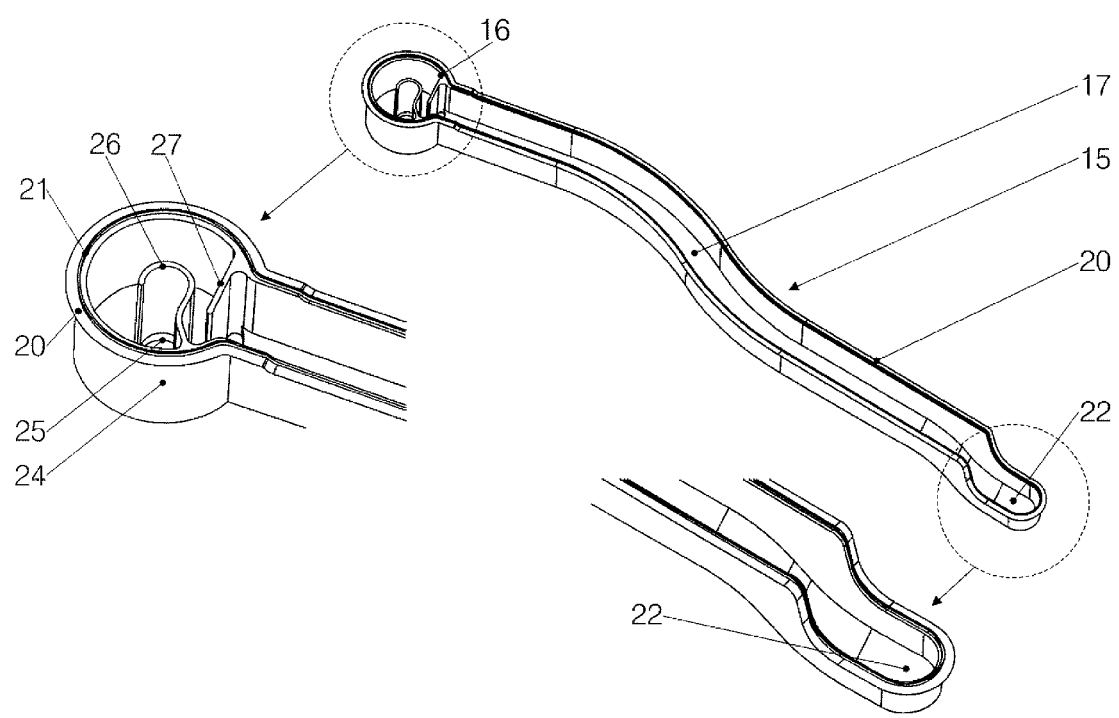
FIG. 3 view of the formed piece of FIG. 2 with details, prior to mounting.

FIG. 3 shows this formed piece 15 in detail. The half pipe 17 is at first planar and extends in a curve, and thereafter ends in a lowered offset portion 22 fitting onto the step 9 with the first hole 10 of the plastic shell 1 leading to the atmosphere. The mouth piece 16 at the other end of the half pipe 17 is herein embodied as a liquid trap. A welding flange 20 having a root 21 (which will be described in more detail hereinafter) continuously extends all around the whole formed piece (also over the offset portion 22).

The mouth piece 16 embodied as a liquid trap has the outline of a cylinder jacket 24 and at its center includes a hole 25 which is open towards the interior of the tank. The hole 25 is, at a portion of its circumference, surrounded by a guide wall 26 extending to the plane of the welding flange 20 and to the cylinder jacket 24. There is an equally high baffle wall 27 at the transition from the cylinder jacket 24 to the half pipe 17. Vapors entering through the hole 25 and loaded with droplets are guided between the cylinder jacket 24 and the guide wall 26 in a circular path and then collide with the baffle wall 27. The droplets are separated due to the centrifugal force and the baffle wall. They flow through the hole 25 back into the tank.

Figure 4:
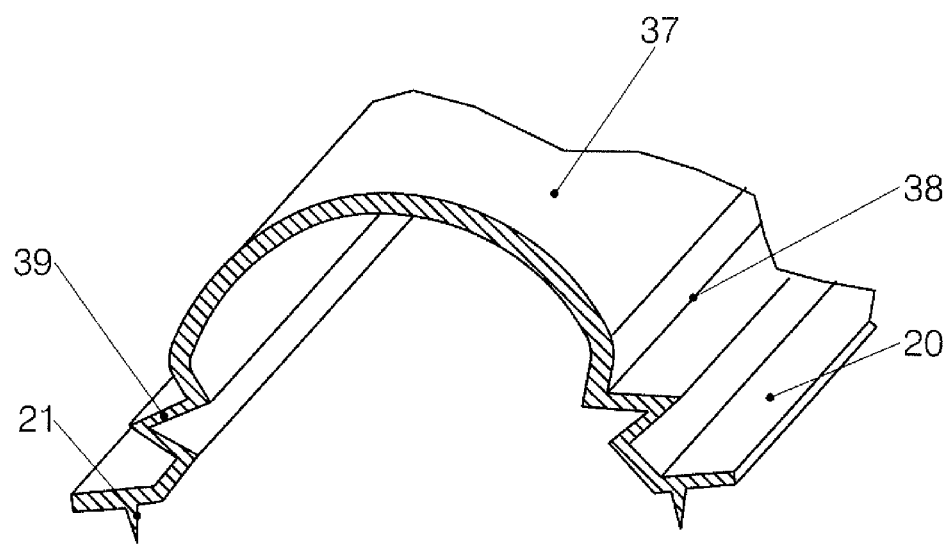
FIG. 4 detail of a variant.

The variant of FIG. 4 shows a half pipe 37, in this case having a semi-circular cross section. The transition of the half pipe 37 to its welding flange 20 with the root 21 is herein embodied as longitudinally extending bellows 38, 39. For this, the cross section of the wall parts of the half pipe 37 has a zig-zag shape. Due to this fact, the bendable welding flange is more capable of adapting to unevenness or tolerances.

Figure 5:
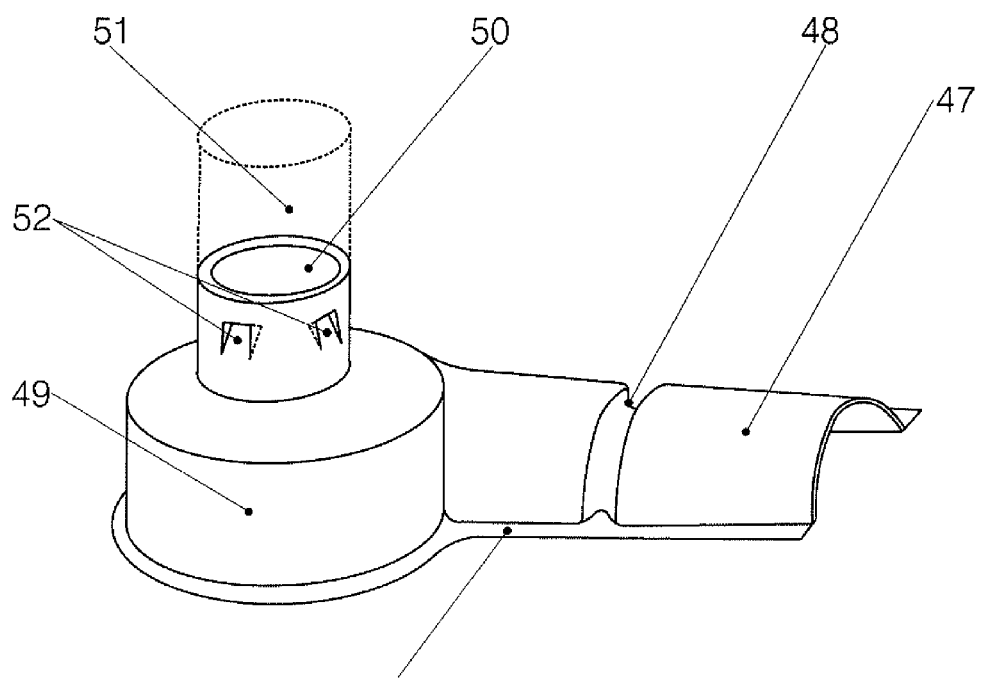
FIG. 5 detail of a further variant.

The variant of FIG. 5 shows a half pipe 47, which is stiffened in the transverse direction by a transversely extending rib 48. The rib 48 can be arched inwardly (as shown) or outwardly. If several of such ribs succeed one another, the half pipe is soft to bending in the longitudinal direction and its length can be slightly adapted. In this case the mouth piece 49 has a cylindrical plug-on flange 50 having at least two latches 52 distributed over its circumference. A valve, which is indicated in a dashed line only, can be inserted in the cylindrical plug-in flange 50 and snap-fitted with the latches 52.

Figure 6:
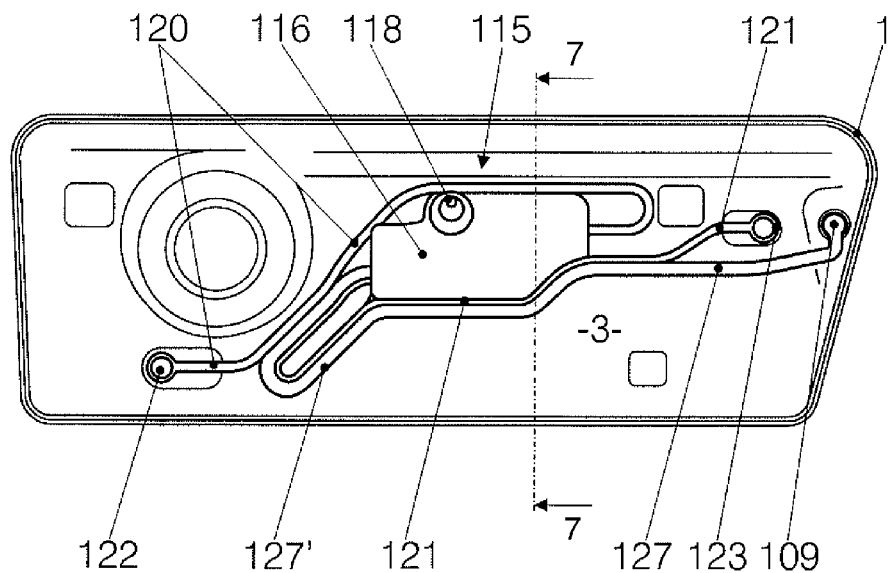
FIG. 6 bottom view of a further developed embodiment of a fuel tank according to the invention.
Figure 8:
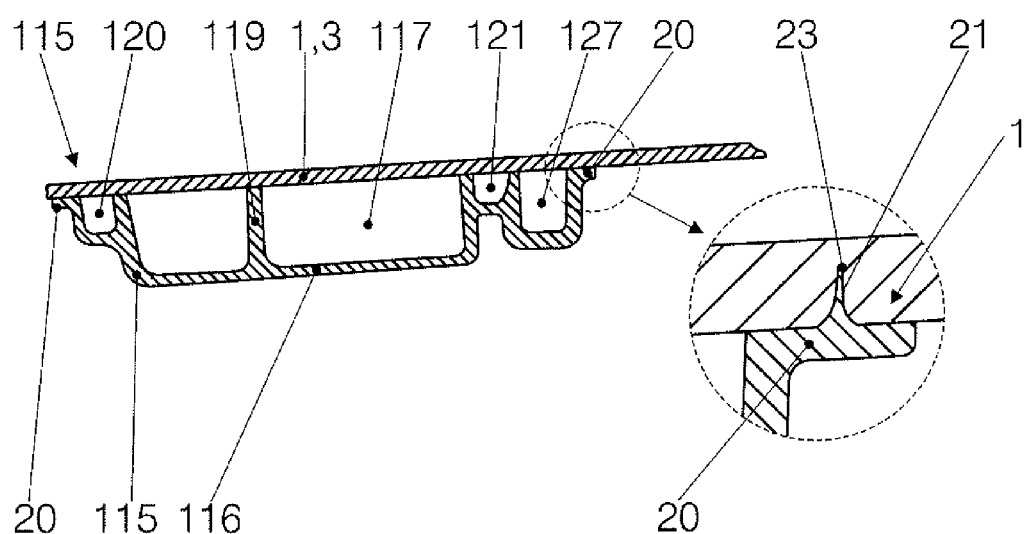
FIG. 8 detail 8 in FIG. 7.

FIGS. 6, 7 and 8 show an embodiment of a complex venting device, in which the advantages of the invention are especially effective. In this case the formed piece 115 is integral with a number of channels, but nevertheless is merely an flat open component. One of the channels is enlarged to form a debubbling tank 116 having a space 117. The space 117 has a guide wall 119 and is connected to the interior of the fuel tank through an opening 118. The space 117 of the debubbling tank 116 is further connected to mouth pieces 122 and 123 through a first connection channel 120 and a second connection channel 121, respectively. The mouth pieces 122 and 123 can be embodied as liquid traps, such as in FIG. 3, or as plug-in flanges for a valve (such as in FIG. 5). They are arranged at regions of the fuel tank which are at a distance from one another in order to render venting independent of position. The connection channels 121, 122 have a relatively small cross section, but nevertheless they have welding flanges located on both sides thereof and following their course. At places where they are lead along the debubbling tank 116, they are joined thereto (see FIG. 8).

A venting channel 127 having a larger cross section leads from the debubbling tank 116 to an end piece 109, which is also closely connected to the plastic shell 1 and surrounds the hole 10 leading to the atmosphere. This venting channel 127, too, with its loop 127' has welding flange closely following its contour. At places where it is lead along the debubbling tank 116, it is joined thereto (see FIG. 8).

FIG. 8 clearly shows that the formed piece 115 integrally forms the debubbling tank 116, the connection channels 120, 121 and the venting channel 127. The encircled detailed representation shows that the root 21 forming a sharp blade 23 of the welding flange 20 surrounding the whole formed piece has penetrated the plastic shell. The guide wall 119 and further intermediate walls can be connected to the plastic shell 1 in the same way.

During manufacture of a fuel tank according to the invention, the formed piece is either injection-molded in a simple core-less shape or pressed from a planar plastic panel. The plastic tank is either blown or its parts, in this case the two plastic shells, are pressed or injection-molded in the usual way. For this purpose, the plastic tank or the respective plastic shell is brought to a temperature at which the plastic is soft and weldable thereto by pressing the formed piece thereon. As soon as the mold for manufacturing the plastic shell has been opened and as long as the shell is still hot, or, in other words, as soon as the injection-molding process has been finished, the cold formed piece is pressed into the plastic shell still located in the mold. Due to the fact that the root 21 of the welding flange 20 is tapered, this not only requires a small pressing-in force, but also has the big advantage that the region of the root near the blade 23 is thin enough to melt immediately after its penetration of the plastic shell 1 and thus makes an especially tight and sealed connection therewith. Thereafter also the thicker regions of the wedge-shaped cross section of the root 21 and the welding flange 20 join to the plastic shell 1. In cases where a valve is to be inserted in one of the mouth pieces, this can be done immediately thereafter or else beforehand. In cases where the plastic tank consists of several parts, the two plastic shells 1,2 are eventually interconnected along their welding flanges 5.

The invention claimed is:

1. A plastic fuel tank comprising:
   a first wall and a second wall defining an interior space;
   installations located in the interior space; and
   a separate channel shaped formed piece having side walls extending from a top wall wherein each side wall has a free end which is welded all around to the first wall to form a closed channel together with the first wall, wherein a welding flange forms a closed curve with the wall and the channel shaped formed piece;
   the channel shaped formed piece has a mouth piece integrally formed thereon at an end of the channel, wherein the mouth piece has an opening which communicates with the interior space for venting the interior space through the channel shaped formed piece.

2. The fuel tank according to claim 1, wherein the channel shaped formed piece forms a plurality of channels wherein one channel is at least locally enlarged such that it forms a debubbling tank together with the first wall, wherein the debubbling tank defines with the first wall an inner space.

3. The fuel tank according to claim 1, wherein the closed channel of the channel shaped formed piece is connected to atmosphere by a hole overlapped by an end portion of the channel shaped formed piece provided in the first wall of the tank.

4. The fuel tank according to claim 1, wherein the mouth piece has a flange formed for receiving a valve element.

5. The fuel tank according to claim 4, wherein the flange has elastic parts for snap-fitting the valve element.

6. The fuel tank according to claim 1, wherein the mouth piece is formed at one end of the channel as a drop separator.

7. The fuel tank according to claim 6, wherein, in order to form the drop separator, the mouth piece has a hole which is open towards the interior space of the tank and to which a cylindrical guide wall is connected, followed by a baffle wall.

8. The fuel tank according to claim 1, wherein the welding flange has at least one root having a wedge-shaped cross section, wherein the root substantially perpendicularly penetrates the plastic tank.

9. The fuel tank according to claim 1, wherein a portion of the formed piece forming the channel has at least one reinforcing rib extending transversely to a longitudinal direction of the channel.

* * * * *